United States Patent [19]
Davies et al.

[11] Patent Number: 5,481,868
[45] Date of Patent: Jan. 9, 1996

[54] VARIABLE AREA NOZZLE WITH FIXED CONVERGENT-DIVERGENT WALLS AND RELATIVELY MOVABLE PARALLEL SIDEPLATES

[75] Inventors: Guy E. Davies; David R. Tucker, Fareham, United Kingdom

[73] Assignee: GEC-Marconi Limited, Middlesex, United Kingdom

[21] Appl. No.: 225,943

[22] Filed: Apr. 11, 1994

[30] Foreign Application Priority Data

Apr. 30, 1993 [GB] United Kingdom ............. 9308982

[51] Int. Cl.[6] ............................................. F02K 1/30
[52] U.S. Cl. ................................ 60/232; 239/265.25
[58] Field of Search ........................ 60/232, 228, 242; 239/265.25, 265.19; 244/52

[56] References Cited

U.S. PATENT DOCUMENTS

| | | |
|---|---|---|
| 3,154,917 | 11/1964 | Williamson ......................... 60/232 |
| 3,194,014 | 7/1965 | Wilson . |
| 3,973,731 | 8/1976 | Thayer . |
| 4,522,357 | 6/1985 | Bains et al. ......................... 244/52 |
| 4,690,329 | 9/1987 | Madden ......................... 239/265.19 |
| 5,098,022 | 3/1992 | Thaye ......................... 239/265.25 |
| 5,110,047 | 5/1992 | Toews ......................... 239/265.19 |

FOREIGN PATENT DOCUMENTS

| | | |
|---|---|---|
| 1457676 | 11/1966 | France . |
| 2051076 | 4/1972 | Germany ......................... 244/52 |
| 2256438 | 5/1974 | Germany ......................... 239/265.19 |
| 580995 | 9/1946 | United Kingdom . |

*Primary Examiner*—Timothy S. Thorpe
*Attorney, Agent, or Firm*—Lowe, Price, Leblanc & Becker

[57] ABSTRACT

A variable area convergent-divergent nozzle for use as an attitude control thruster on a VTOL aircraft is formed by a curved wall forming a chamber a convergent section a throat section and a divergent section and a pair of parallel side plates, one of the side plates being movable to alter the area of the nozzle.

6 Claims, 2 Drawing Sheets

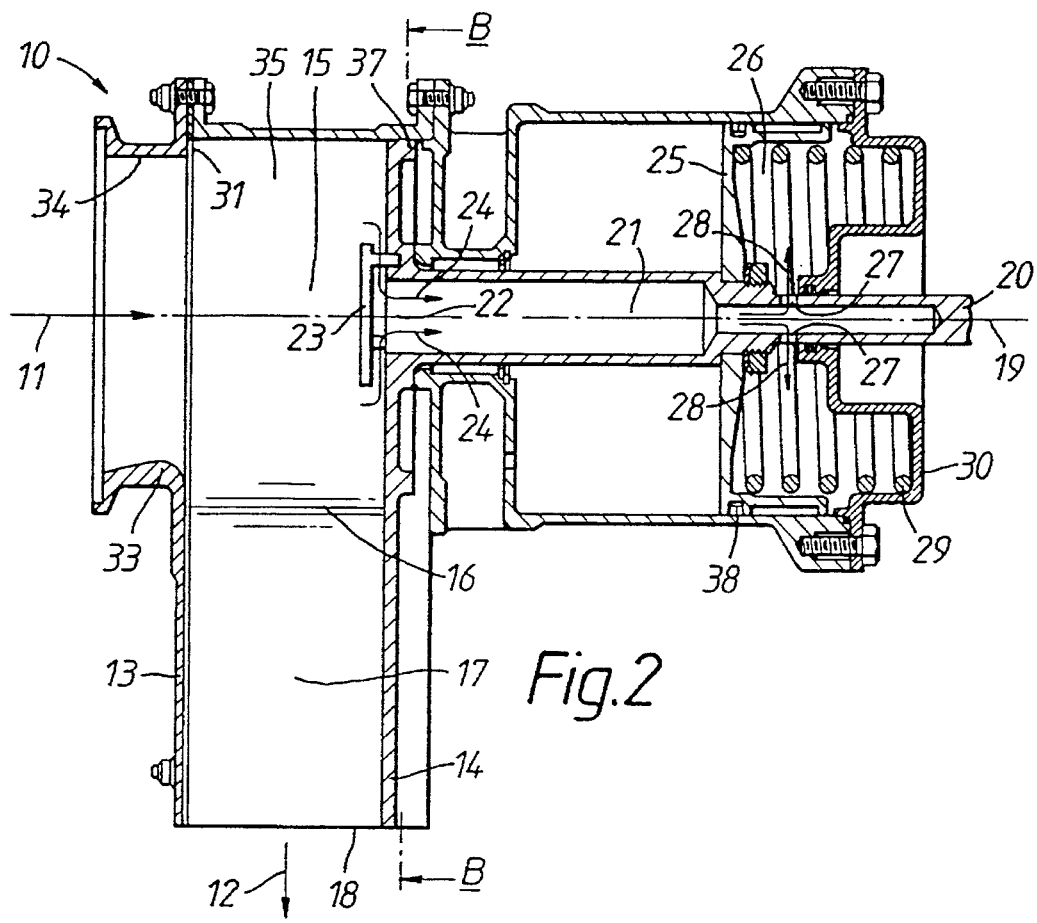
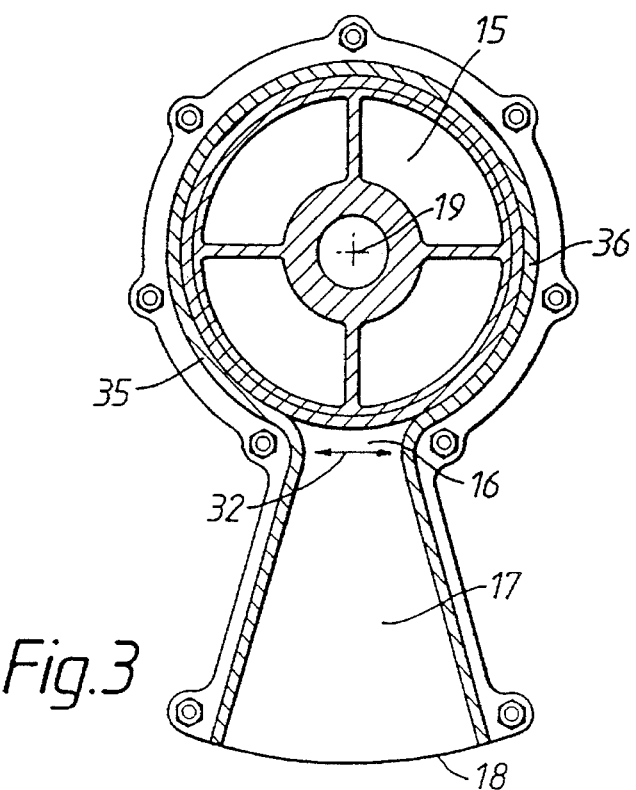

5,481,868

VARIABLE AREA NOZZLE WITH FIXED CONVERGENT-DIVERGENT WALLS AND RELATIVELY MOVABLE PARALLEL SIDEPLATES

BACKGROUND OF THE INVENTION

This invention relates to a variable area convergent-divergent nozzle and particularly to a variable area convergent-divergent nozzle acting as part of an attitude control system for a vertical take off or landing aircraft.

Generally such attitude control systems are formed by a plurality of downwardly acting thrusters at the extremities of the aircraft—nose, tail and wingtips.

In vertical take off and landing (VTOL) aircraft it is well known that some form of reaction attitude control system must be used in order to allow the aircraft to be manoeuvered and remain stable while hovering because the conventional flight control surfaces will not work in the hover because there is no movement of air over them.

A known type of reaction attitude control thruster is shown in FIG. 1. The thruster is supplied with high pressure air from the aircrafts gas turbine engine along a duct 1 as indicated by the arrow 2. The duct 1 ends at a convergent nozzle 3 which accelerates the air through the exit or throat of the nozzle 3. The air leaving the nozzle 3 as indicated by an arrow 8 produces an upward thrust on the nozzle 3 parallel to the arrow 8 which depends on the exit velocity, the mass of air passing through the nozzle 3 and the pressure of the air leaving the throat 4. In order to allow this generated thrust to be controlled to allow the aircraft to be manoeuvered a gate 5 is used which pivots about a pivot point 6 under the control of a servo mechanism (not shown) to open or close the throat 4 by sliding an end plate 7 of the flap 5 across the throat 4 of the convergent nozzle 3. Convergent nozzles are relatively inefficient, so in order to allow a large enough couple to be generated on the aircraft for the attitude control to be effective the end plate 7 of the flap 5 has a curved portion 7a shaped so that when the flap 5 is moved so that the curved portion 7a covers the throat 4 of the convergent nozzle 3 the air leaving the nozzle 3 is diverted in the opposite direction to its normal flow, i.e. upwards in FIG. 1 to generate a downward thrust. By arranging a pair of attitude control thrusters on opposite sides of the aircraft's centre of gravity so that one thrusts upwards and the other downward simultaneously an increased couple on the aircraft is generated. However this creates a problem because the upwardly directed air generates a downward thrust on the aircraft causing it to loose altitude which is undesirable. The main problems with thrusters of this type are, firstly that the air passing through the nozzle 3 is relatively hot and as a result when the nozzle is operating at maximum thrust with the flap 5 moved so that the plate 7 is entirely clear of the throat 4 of the convergent nozzle 3 the convergent nozzle 3 is heated by the hot compressor air while the flap 5 remains cool, as a result differential thermal expansion occurs so the flap 5 must be sized such that when the convergent nozzle 3 is at the maximum temperature of the compressor air and the flap 5 is at the minimum ambient temperature in which the aircraft will be flown the end plate 7 of the flap 5 can still be passed across the throat 4 of the convergent nozzle 3 to block the air flow. As a result of the flap 5 having to be sized for this extreme condition, when the flap 5 and convergent nozzle 3 are at the same temperature a large gap exists between the end plate 7 of the flap 5 and the throat 4 of the convergent nozzle 3 resulting in air leakage, even when the flap 5 is placed to block the flow. Such leakage is undesirable because the air passing through the attitude control thrusters is taken from the compressor stages of the gas turbine engine providing the necessary thrust to allow the aircraft to fly and so the greater the amount of air passing through the thrusters the lower the efficiency of the main gas turbine and the less thrust or power is available for flight.

A second problem is that when the plate 7 is part way across the throat 4 of the nozzle 3 to produce an intermediate level of thrust the air no longer exits the nozzle 3 in line with the nozzle axis as shown by arrow 8 but at an angle to the nozzle axis as indicated by arrow 8A due to the assymetery of the combined nozzle throat 4 and flap end plate 7. This causes a sideways thrust to be applied to the aircraft as well as a rotating couple, making the aircraft difficult to control in the hover.

It is known that convergent-divergent (con-di) nozzles which accelerate the gas running through them to supersonic speeds are intrinsically more efficient than simple convergent nozzles but it has not been possible to design a con-di nozzle suitable for use as attitude control thrusters for VTOL aircraft. This is because use of a fixed con-di nozzle together with a valve to control the airflow through it suffers from the problem that the area of the con-di nozzle will only be optimum for the air flow at one thrust level of the thruster and as a result the nozzle be inefficient at all other thrust levels, so wasting compressed air and will provide a non-linear response of thrust against airflow or valve position and it is generally undesirable to include non linear elements in aircraft control systems.

The use of known variable area con-di nozzle designs has not been attempted because the weight of such nozzles and their expense is such that the weight and cost penalties of installing them at each attitude control thruster position in a VTOL aircraft are prohibitive.

BRIEF SUMMARY OF THE INVENTION

This invention was intended to provide a variable area con-di nozzle overcoming these problems at least in part.

This invention provides a variable area convergent-divergent nozzle comprising a pair of fixed opposed walls defining a convergent and a divergent region and a pair of parallel sideplates extending between the walls to form a convergent-divergent nozzle, the sideplates being arranged for relative motion to allow the area of the nozzle to be changed.

Such a design provides a light weight cheap convergent-divergent nozzle suitable for use as an attitude control thruster on a VTOL aircraft.

Being a convergent-divergent nozzle the increased efficienty of the nozzle compared with the prior art removes the need for upwardly directed airflow to generate downward thrust with its attendant disadvantages, further, more a nozzle of this type can be fully sealed when not required to generate thrust so reducing usage of compressed air from the main aircraft engine. Since the sideplates remain parallel at all times the airstream leaving the nozzle is always parallel to the sideplates and as a result the problem of unwanted lateral thrust is avoided.

BRIEF DESCRIPTION OF THE DRAWINGS

An attitude control thruster embodying the invention will now be described by way of example only with reference to the accompanying diagrammatic figures in which:

FIG. 2 shows a cross-sectional view of an attitude control thruster according to the invention, and FIG. 3 shows a cut away view along the line B—B in FIG. 2, identical parts having the same reference numerals throughout.

DETAILED DESCRIPTION

Figure 1:
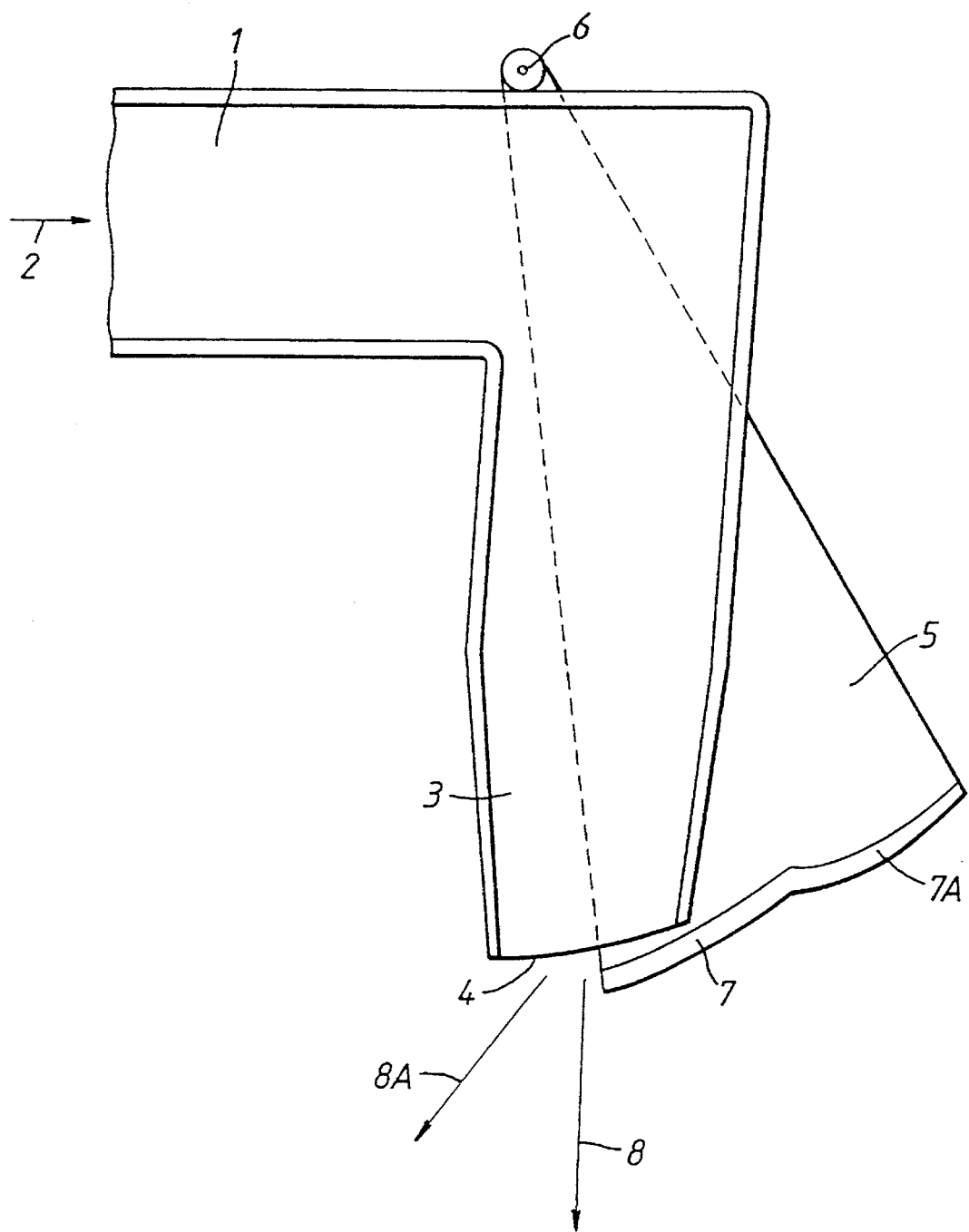
FIG. 1 is a schematic view of a prior art reaction attitude control thruster.

Referring to FIG. 2 a variable area convergent-divergent nozzle 10 used as an attitude control thruster in a VTOL aircraft is shown. High pressure air enters the nozzle 10 along a duct (not shown) linked to an entry portion 34 of the nozzle 10 as indicated by the arrow 11, this compressed air then turns through a 90° angle and exits the nozzle 10 as indicated by the arrow 12.

The nozzle 10 is defined between a first fixed flat sideplate 13 and a second movable flat sideplate 14, the plates 13 and 14 being parallel and forming the side walls of the nozzle 10. The nozzle 10 is substantially "keyhole" shaped and is defined between the plates 13 and 14 by a pair of opposed curved walls 35 and 36 forming a substantially cylindrical chamber portion 15 which also acts as a convergent nozzle, a throat portion 16, a divergent portion 17 and an exit 18 arranged in gas flow series. The pair of opposed walls 35, 36 are joined at the top of the chamber 15 to form a single continuous surface and are only curved in one dimension, they are flat in the direction perpendicular to the plates 13 and 14.

In order to vary the area of the nozzle 10 the movable plate 14 is moved along an axis 19 perpendicular to the plates 13, 14 by a linear actuator (not shown) connected to the plate 14 by a connecting rod 20. As the area of the nozzle 10 changes the volume of air able to pass through it, and thus the thrust produced, will vary linearly.

The connecting rod 20 contains an internal bore 21 communicating with a hole 22 passing through the second plate 14, the hole 22 is covered by an end cap 23 perforated to allow air from the cylindrical chamber 15 to enter the bore 21 as shown by the arrows 24. Rigidly attached to the rod 20 is a piston 25 sliding within a cylinder 26 fixed to the fixed parts of the nozzle 10. A hole 27 in the rod 20 allows air in the bore 21 to pass into the cylinder 26 as shown by the arrows 28. Thus air from the cylindrical chamber 15 can pass into the cylinder 26 so that the pressures within the cylinder 26 and the chamber 15 are equal. The area of the piston 25 is larger than the cross-sectional area of the chamber 15 such that the force acting on the piston 25 due to the pressure of the air within the cylinder 26 is equal and opposite to the force exerted on the plate 14 by the air pressure within the chamber 15 and the rest of the nozzle 10 so that the moving parts of the nozzle 10 are pressure balanced. As a result the actuator does not have to overcome the pressure loads exerted on the plate 14 by the air pressure within the nozzle 10 because they are balanced by the forces acting on the piston 25. The end cap 23 prevents dirt in the compressed air entering the bore 21.

A spring 29 is also contained within the cylinder 26 acting between the piston 25 and an end wall 30 of the cylinder 26 such that the plate 14 is biased towards the plate 13 so that the plates 13 and 14 must be pulled apart by the actuator to keep the nozzle 10 open. This is a fail safe device which ensures that in the event of failure of the connecting rod 20 or actuator the nozzle 10 will close itself and not generate any thrust to unbalance the aircraft.

By moving the plate 14 into contact with the plate 13 the nozzle 10 can be closed. In order to prevent any leakage of air through the nozzle 10 when it is closed a small step 31 is provided around the edge of the chamber 15 so that the plate 14 is in contact with it when the nozzle 10 is closed to provide a good seal.

As the plate 14 is moved towards and away from the plate 13 by the actuator the throat area 16 of the nozzle 10 and thus the quantity of air passing through the nozzle 10 decreases or increases linearly respectively because the width 32 of the throat 16, as shown in the cross section in FIG. 3 remains constant but its depth changes as the plate 14 moves.

Since the plates 13 and 14 remain parallel throughout the movement of the plate 14 the area ratio between the throat 16 and exit 18 of the nozzle 10 (known as the expansion ratio of the nozzle) remains constant because these are defined by the width of the nozzle 10 at the throat 16 and exit 18 which are in turn set by the fixed profiles of curved walls 35 and 36 regardless of the separation of the plates 13 and 14. As a result although the throat area of the nozzle 10 will always be optimum for the airflow, since it is the throat area which is varied to control the airflow, the expansion ratio of the nozzle is fixed and will only be optimum for one particular pressure ratio. The pressure ratio is the ratio of pressures between the ambient pressure outside the nozzle and the pressure of the compressed air supply to it in the cylindrical chamber 15 and will vary depending on the engine power being demanded from the gas turbine engine supplying the compressed air, however the reduction in efficiency due to a mismatch between nozzle expansion ratio and air pressure ratio is relatively minor compared to the reduction in efficiency due to a mismatch between nozzle throat area and air flow and it has been found in practice that even with a wide range of possible pressure ratios a fixed nozzle expansion ratio can be selected so that the nozzle is more efficient than a simple convergent nozzle or a fixed area con-di nozzle across the whole range of pressure ratios.

One cause of energy loss and thus reduced efficiency in the nozzle 10 is the fact that the air exits the nozzle perpendicularly to its direction of entry as shown by the arrows 11 and 12 but it is not usually possible to avoid this in an attitude control thruster for a VTOL aircraft because of the size constraints on the thruster unit and air ducting. However, the amount of loss is reduced by giving the interior corner 33 around which the air turns a relatively large radius. Losses due to the turning of the air can also be reduced by minimising the air velocity so the cross sectional area of the entry portion 34 of the nozzle 10 should be made as large as possible as should the chamber 15 and in order to do this a diffuser section may be inserted between the duct supplying the high pressure air and the nozzle 10 but this is not shown for clarity.

Where the plate 14 is in sliding contact with the cylindrical sides of the chamber 15 a ring seal 37 similar to a conventional piston ring is provided to prevent air leakage between the walls 35, 36 of the chamber 15 and the plate 14 and a similar ring seal is used between the piston 25 and cylinder 26. However no seal is provided between the walls 35, 36 in the throat 16 and divergent section 17 of the nozzle 10 and the edges of the plate 14 because it has been found that air leakage in this region is not large enough to be a problem, however conventional sliding seals could be provided here if desired.

The use of two opposed walls 35 and 36 is not necessary, they could be formed by a single element produced in or bent into an appropriate shape.

It is preferred that one sidewall 13 is fixed while the other sidewall moves, for simplicity, but both sidewalls could move if desired.

We claim:

1. A variable area convergent-divergent nozzle comprising a pair of fixed opposed walls defining a convergent region, a throat and a divergent region therebetween and a pair of parallel sideplates extending between said walls said opposed walls defining in cross section a keyhole shaped structure wherein the convergent region is disposed above the divergent region and the two regions are separated by the throat, and means for relative motion between said parallel sideplates to allow the area of the nozzle to be changed.

2. A nozzle as claimed in claim 1 in which a first one of the sideplates is fixed and a second one of the sideplates is movable relative to the first sidewall.

3. A nozzle as claimed in claim 1 in which the sideplates are flat.

4. A nozzle as claimed in claim 2 in which gas enters the nozzle through the fixed sideplate.

5. A nozzle as claimed in claim 4 in which the gas entering the nozzle turns through substantially 90° successively passing through the convergent region, throat, and divergent region before leaving the nozzle.

6. A nozzle as claimed in claim 4 in which the movable sideplate can be moved into contact with the fixed sideplate to shut off gas flow through the nozzle.

* * * * *